INVENTORS
P. Patz
E. A. Graetz
BY Lieber & Lieber
ATTORNEYS.

Dec. 19, 1961    P. PATZ ET AL    3,013,673
SILAGE UNLOADER

Filed Aug. 6, 1956    4 Sheets-Sheet 4

INVENTORS
P. Patz
BY E. A. Graetz
Lieber & Lieber
ATTORNEYS.

United States Patent Office 3,013,673
Patented Dec. 19, 1961

3,013,673
SILAGE UNLOADER
Paul Patz and Edward A. Graetz, Pound, Wis.
Filed Aug. 6, 1956, Ser. No. 602,193
1 Claim. (Cl. 214—17)

The present invention relates in general to improvements in the art of dispensing fodder from storage receptacles, and it relates more specifically to improvements in the construction and operation of mechanism for automatically unloading silage from enclosures such as silos.

The primary object of the invention is to provide an improved silage unloader which is relatively simple, compact and durable in construction, and which is also automatic and highly efficient in operation.

Many different devices for mechanically removing fodder such as ensilage from storage receptacles such as silos, have heretofore been proposed, and some may have been installed and utilized with moderate success, but all of these prior so-called "silage unloaders" have been highly objectionable for diverse reasons. When moist ensilage is deposited within a silo, it rarely packs uniformly throughout the entire mass thus creating local pockets or soft spots, and when the silos are located in areas subject to extreme cold the moist material adjacent to the enclosing wall freezes and clings to the inner wall surface.

The previously proposed silage unloaders are of two general types, in one of which the material is withdrawn from the bottom of the mass, while in the other type the fodder is scraped spirally inwardly from the top of the mass toward the central axis of the silo from whence it is conveyed and delivered through a side opening in the silage confining wall. The first mentioned prior type necessitates subjecting the unloading unit to the entire weight of the heavy mass of material especially when the silo is fully loaded and also disposes the mechanism in the zone of maximum moisture, while the second prior type with its inward spiral transportation of material scraped from the top of the mass fails to insure uniform removal when local pockets are present, and both of the prior types fail to effectively release frozen ensilage clinging to the inner silo surface and most of them are also too complicated and frail in structure.

It is therefore an important object of our present invention to provide an improved automatic ensilage unloading unit which obviates all of the above mentioned objections of prior unloaders of all types.

Another important object of this invention is to provide an improved silage unloader which is very flexible in its adaptations and capable of being readily associated with silos of different internal diameters.

A further important object of the invention is to provide a silage removing device which floats upon the top of the mass and insures uniform delivery of material regardless of irregularities in the top surface and of the existence of soft spots or pockets.

Still another important object of the present invention is to provide an improved mechanism for effectively unloading fodder or the like from confining receptacles, which functions to positively remove material from the inner surfaces of such receptacles even when such material is in frozen or otherwise adhering condition.

An additional important object of our invention is to provide an automatically functioning silage unloading assemblage which is extremely dependable in operation, and which requires minimum attention and power consumption in order to operate the same.

These and other objects and advantages of the invention will be apparent from the following detailed description.

A clear conception of the features constituting the present improvement, and of the construction and operation of a typical silage unloader embodying the invention, may be had by referring to the drawings accompanying and forming a part of this specification in which like reference characters designate the same or similar parts in the various views.

While the invention has been shown and described as having been incorporated in an electric motor driven silage unloader especially applicable to the top of the mass of fodder confined within a circular receptacle, it is not the intent to restrict the use of the improved features to such an assemblage; and it is also contemplated that specific descriptive terms employed herein be given the broadest possible interpretation consistent with the disclosure.

Figure 1:
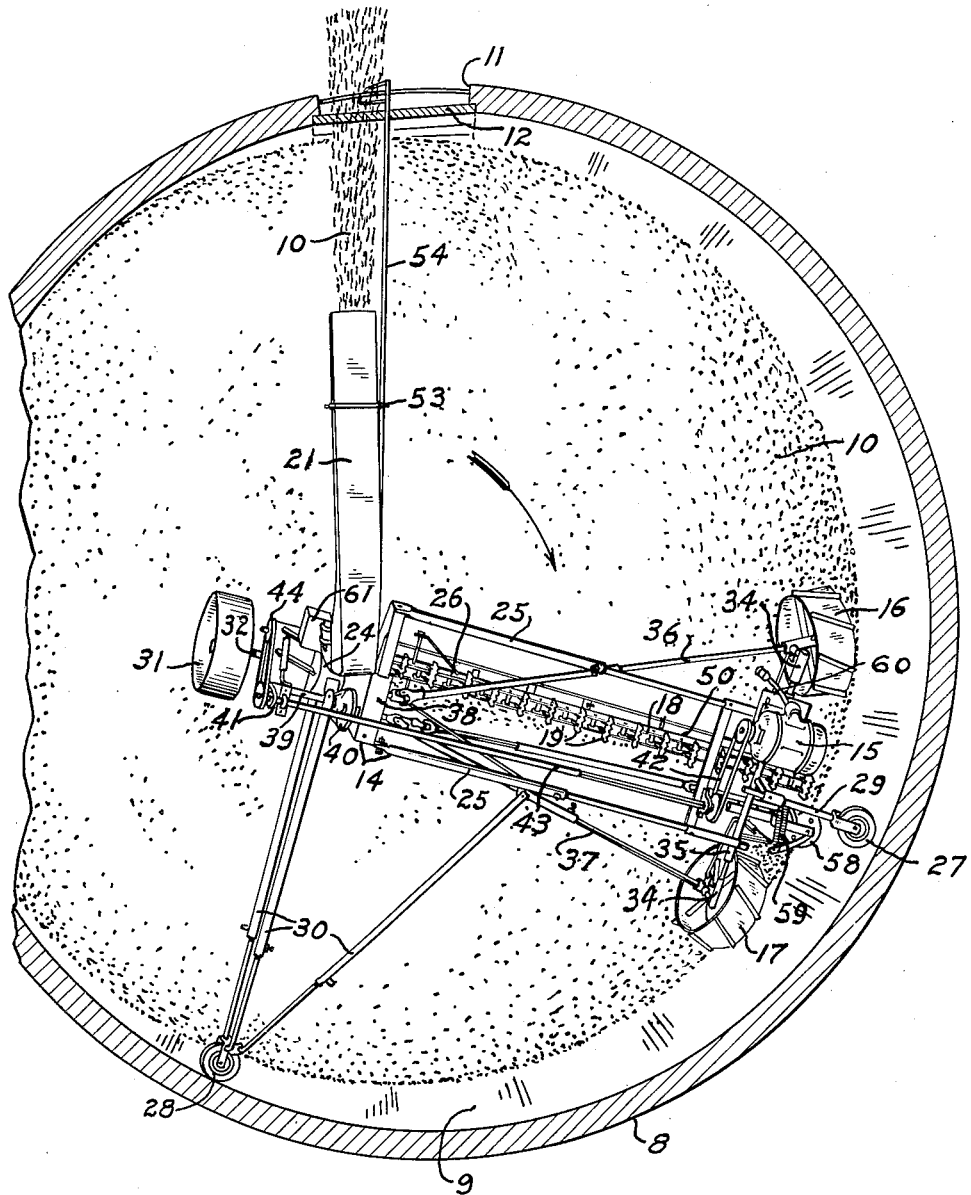
FIG. 1 is a top perspective view of a commercial silage unloader involving the present invention and showing the device in action within an annular silo wall.
Figure 2:
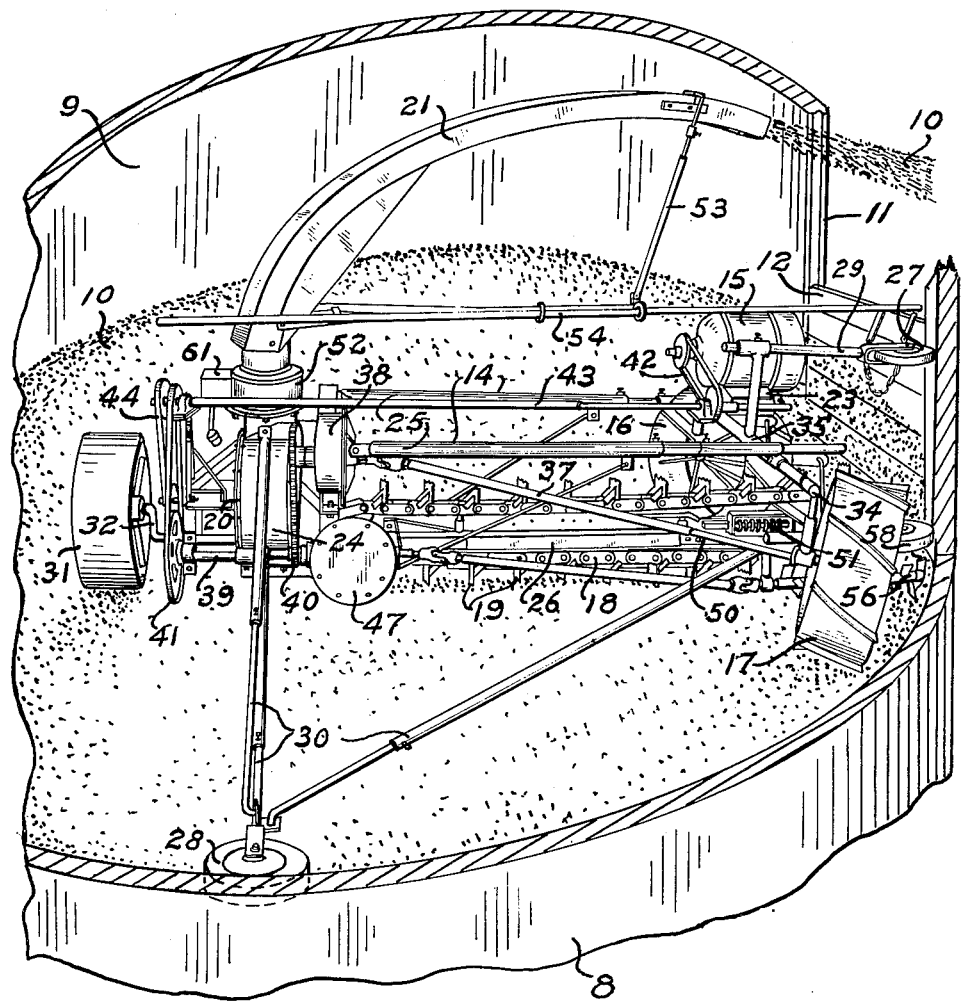
FIG. 2 is a slightly enlarged front perspective view of the same silage unloading unit also showing the same applied to silage within an annular receptacle wall.

Referring particularly to FIGS. 1 and 2 of the drawings, the ordinary silo with which the present improved unloader is effectively cooperable, is provided with an annular wall 8 having a cylindrical inner surface 9 for confining bulk silage 10, and one portion of the wall 8 is interrupted by an elongated opening 11 having vertically stacked successively removable slats 12 slidably confined therein and coacting with the silage 10.

The improved silage unloader which is adapted to cooperate with such a commodity laden silo, is shown in FIGS. 1 to 4 inclusive and comprises in general, a rigid main frame 14 radiating from and being revolvable about the central upright silo axis; an electric propelling motor 15 and a pair of cleated traction wheels 16, 17 associated with the outer swingable end of the frame 14; mechanism for transmitting driving motion from the motor 15 to the wheels 16, 17 through the inner end of the frame 14 to revolve the latter about the silo axis; an endless silage conveyor 18 suspended from the frame 14 and having a series of material transporting flights 19 movable inwardly toward the silo axis, the conveyor 18 also being driven by the propelling motor 15; and a rotary silage discharge blower 20 associated with the inner end of the frame 14 and being operable by the motor 15 to deliver silage 10 transported inwardly by the conveyor flights 19 from within the wall 8 through a fixed spout 21 and the opening 11.

The main frame 14 is composed primarily of an outer motor and traction wheel support 23 and an inner blower housing 24 interconnected by a pair of telescopic upper beams 25 and by the conveyor mounting beam 26, and all of these frame beams 25, 26 are adjustable in length so as to vary the radius of swing or revolution of the frame 14. In order to maintain the blower housing 24 centralized with respect to the annular silo wall 8, a pair of guide rollers 28, 58 which are adapted to roll along the inner silo surface 9 are provided, and the guide roller 28 is journalled in the outer ends of longitudinally adjustable braces 30, the lengths of which may be varied to fit silos of different internal diameters and to also effect accurate centralization of the entire unloading unit. The blower housing 24 should be disposed coaxially of the silo wall 8 and is supported upon the silage 10 by a large carrying wheel 31 journalled for rotation upon a crank shaft 32 which is adjustably secured to the housing 24, and this wheel 31 may be adjusted with the aid of the crank shaft 32 to raise or lower the inner end of the frame 14 and the inclination of the flight conveyor 18 so as to vary the rate of delivery of the silage and cooperates with the traction wheels 16, 17 to provide a three point support for the silage unloader while resting upon the mass of silage 10. The carrying wheel 31 also cooperates with an inclined leveling wheel 27 carried by a bracket 29 mounted upon the main frame 14 and which coacts with the inner silo surface 9, to retain the conveyor 18 in laterally horizontal position as it revolves over the upper surface of the silage 10.

The two traction wheels 16, 17 have peripheral cleats and are suspended from the motor support 23 by transverse rods 34 which are longitudinally adjustable within a tubular bracket 35 and provide bearings for the outer ends of longitudinally adjustable driving shafts 36, 37 respectively, the inner ends of which are connected with a power transmitting unit 38 carried by the blower housing 24. The power input shaft of this unit 38 is drivingly connected to a counter shaft 39 by a chain drive 40, and the counter shaft 39 is journalled on the housing 24 and is drivingly connected to the motor 15 by a pair of endless drives 41, 42 and a telescopic driving shaft 43. The extreme inner end of the driving shaft 43 is also drivingly connected to the blower rotor by another endless drive 44, and the counter shaft 39 is also drivingly connected to the inner sprocket 45 of the silage conveyor 18 by gearing confined within the casing 47.

Figure 4:
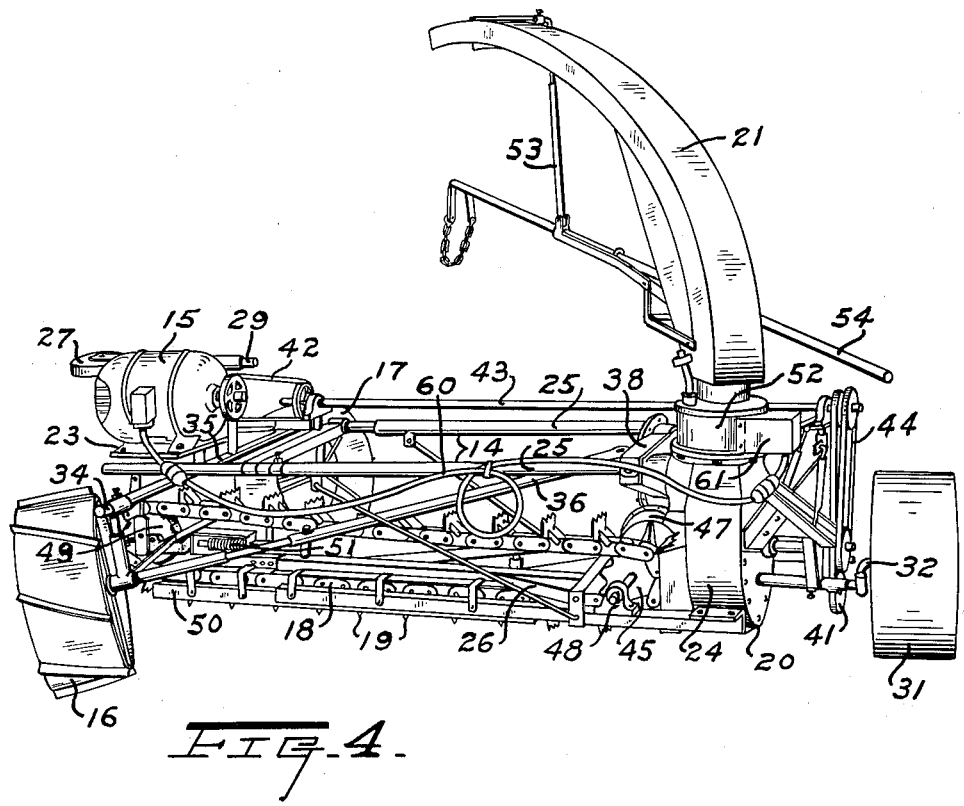
FIG. 4 is a rear perspective view of the unloading unit, similar to that of FIG. 2 but viewed in the opposite direction.

The inner driving sprocket 45 of the endless flight conveyor 18 is journalled in a fixed bearing 48 at the inner end of the frame beam 26, and the outer end of the conveyor 18 coacts with an idler sprocket 49 which is constantly urged away from the sprocket 45 by a spring 51 thus tensioning the conveyor chain. The conveyor 18 is operable so that the upper flights 19 move outwardly while the lower flights travel inwardly during the normal operation, and a longitudinally adjustable telescopic scraper 50 is suspended from the beam 26 rearwardly of the lower conveyor flight, as shown in FIG. 4. The silage discharge spout 21 has its material receiving end connected to the blower outlet by a swivel joint 52 while its outer discharge end is supported by an adjustable prop 53 coacting with a retainer rod 54 which is cooperable with a side of the silo outlet opening 11 and with the swivelled end of the spout 21 so as to prevent the latter from revolving with the blower 20, as shown in FIGS. 1 and 2.

Figure 3:
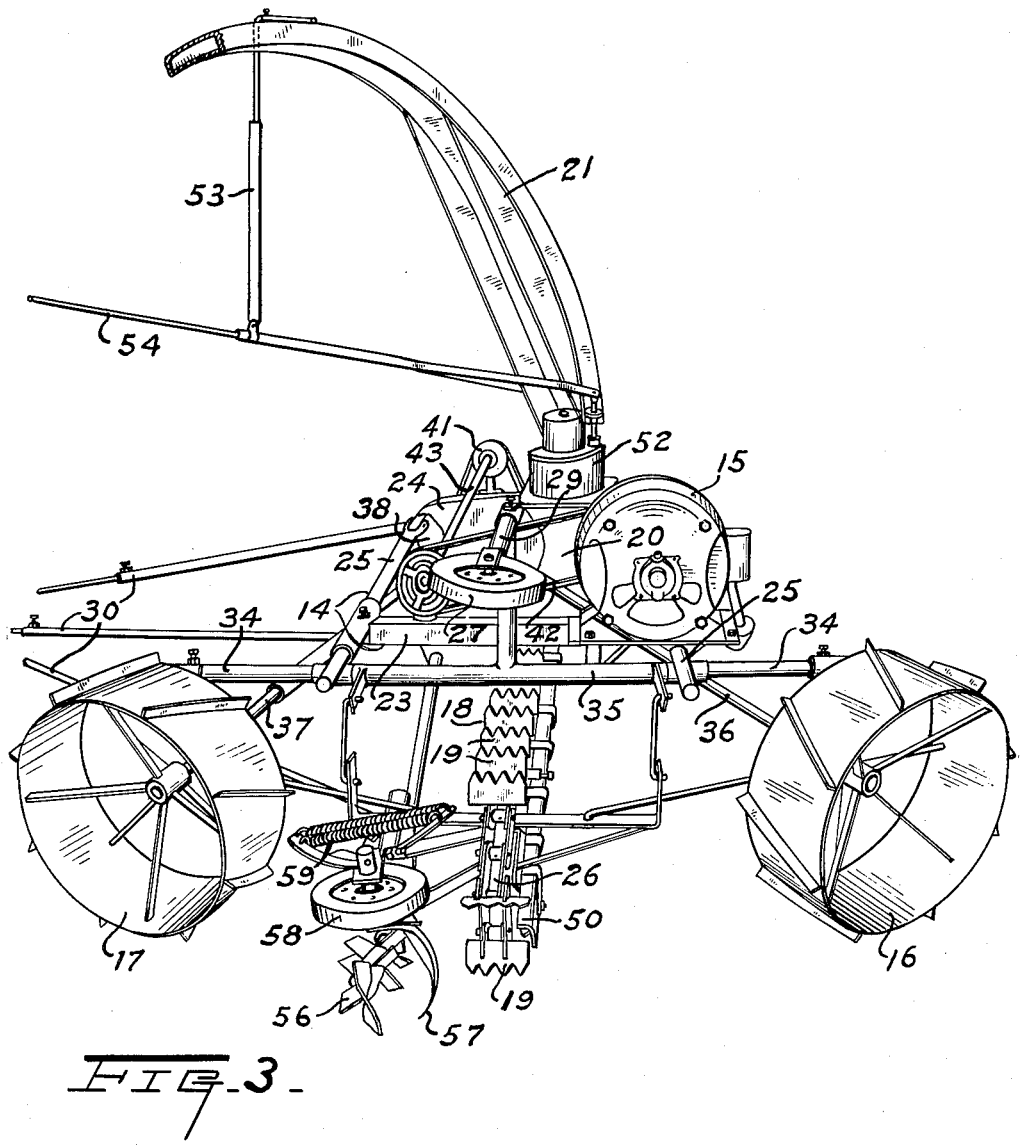
FIG. 3 is a further enlarged end perspective view of the unloading mechanism alone, looking inwardly toward its axis of rotation.

In order to disintegrate and remove packed or frozen silage 10 from the silo wall 8 adjacent to the surface 9, a special device such as shown in FIG. 3 may also be provided. This device comprises a bladed disintegrating rotor 56 followed by a scraper or scraping bar 57 both carried by the outer extremity of the main frame 14 and adapted to travel in close proximity to the silo surface 9. The blades of the rotor 56 are formed to dig into and loosen the silage 10 while the scraping bar 57 is urged by a releasing spring 59 against the inner silo surface 9 but will retract upon striking a fixed bolt or the like on the wall 8. The rotor 56 is adapted to be driven by the motor 15 and the adjacent guide roller 58 may be suspended from the beam 26 and rides along the inner silo surface 9. The electric motor 15 which is also mounted upon the outer end of the frame 14 is adapted to be energized through a current conductor 60 and slip rings associated with the spout swivel joint 52, and the operation of the motor 15 and of the entire unit is controllable by a conveniently located control switch through a junction box 61 associated with the swivel near the axis of revolution of the unit.

When the parts of the improved silo unloader have been properly constructed and assembled as hereinabove described and a silo has been supplied with silage 10, the unloading unit may be positioned centrally within the annular wall 8, whereupon the braces 30 which support the guide wheel 28, should be adjusted in length to cause the two guide wheels 28, 58 to travel in contact with the internal silo surface 9 and to also enable the main frame 14 to revolve about the central silo axis. The frame beams 25, 26 and the propelling wheel driving shafts 36, 37 should also be adjusted in length to properly position the main conveyor 18, the traction wheels 16, 17, the disintegrating rotor 56, and the guide wheel 58, so that the entire upper surface of the silage mass will be covered during revolution of the frame 14 around the silo axis, and the carrying wheel 31 should also be adjusted to cooperate with the leveling wheel 27 and with the traction wheels 16, 17 in order to provide a three point support for the unloader.

With the unloading unit thus adjusted and centralized, the silage discharge spout 21 should be positioned so that it will direct the removed silage 10 outwardly through the opening 11 and fixed against revolution, whereupon the motor 15 may be started by actuation of the control switch. During subsequent operation of the driving motor 15, the traction wheels 16, 17 will be driven to revolve the frame 14 and the conveyor 18 about the silo axis in a clockwise direction as viewed in FIG. 1, and the endless conveyor 18 will also be operated to cause its lower flights 19 to travel toward this axis, while the blower 20 will be simultaneously actuated and revolved to constantly remove the silage 10 being brought inwardly by these flights and to deliver it upwardly through the swivel joint 52 and fixed discharge spout 21 in a constant stream past the outlet opening 11, as depicted in FIGS. 1 and 2. While the frame 14 and conveyor 18 are being thus revolved, the disintegrating rotor 56 will also be actuated to loosen and transport the silage 10 near the wall 8 and in the path of the revolving traction wheels 16, 17 into the outer end of the main conveyor 18 thus insuring uniform removal of silage from the entire top area of the mass, and the scraping bar 57 will remove adhering silage from the surface 9.

Since the frame 14 and the conveyor 18 revolve at relatively slow speed, especially near the silo axis, an attendant may safely enter the silo for inspection purposes while the unloader is operating, and as the delivery of silage 10 continues the entire unit will gradually drop so as to cause it to constantly rest upon the silage and the revolving scraper 50 will hold loose silage within the conveyor path. The carrying wheel 31 will revolve with the frame 14 and constantly cooperates with the leveling wheel 27 to maintain the conveyor 18 in approximately horizontal position relative to the mass of silage 10, regardless of the existence of local pockets or soft spots in this mass, and when the non-revolvable discharge spout 21 has lowered sufficiently additional slats 12 may be removed from within the opening 11 so as to effect delivery of the stream of silage into a suitable receptacle located externally of the silo.

The scraper 50 cooperates with the lower stretch of the conveyor 18 to retain the silage in the path of the flights 19, and these flights may be provided with one or more teeth depending upon the nature of the ensilage being handled. The adjustable scraping bar 57 keeps the surface 9 clean at all times, and the rotor 56 cooperates with the conveyor 18 so as to remove silage 10 from the top of the entire mass. Since the unloading unit is not attached to the silo but merely rides on the mass of ensilage it will automatically descend during normal operation, and may be quickly installed or removed, and adjusted to fit various size silos.

From the foregoing rather detailed description of the construction and operation of the improved silage unloader, it should be apparent that the present invention in fact provides a unit which is relatively simple in construction, automatic in operation, and highly flexible in its adaptations. The various parts of the unloading device may be fabricated from readily available materials and at moderate cost to produce a durable and readily installable assemblage adapted to effectively cooperate with silos of different diameters in which the weight of the propelling motor 15 is carried primarily by and bears upon the traction wheels 16, 17 and thus aids in most effectively applying the traction force. The single motor 15 also positively drives the traction wheels 16, 17 through twin drives, and also propels the main conveyor 18 and the blower 20; and the guide wheels 28, 58 when properly adjusted effectively maintain the unit centralized within the annular silo wall 8, while the wheels 27, 31 maintain it leveled.

While the three point support afforded by the wheels 16, 17, 31 is important in order to insure uniform removal of sliage 10, the disintegrating rotor 56 cooperating with the scraping bar 57 also performs an important function by loosening and removing sticky or frozen silage 10 from within the path of travel of the wheels 16, 17 and near the internal silo surface 9. The serrated flights 19 of the endless main conveyor 18 cooperate with this rotor 56 and blade 57 and with the inlet of the blower 20 to constantly and positively transport silage 10 off of the entire upper surface of the mass in a most effective manner, and the beam 50 associated with the trailing edges of the lower flights 19 effectively distributes loose silage 10 and maintains it within the path of advancement of these flights. While the endless flight conveyor 18 operates well, any other suitable type of conveyor may be substituted, and the improved silage unloader has proven highly satisfactory and successful in actual use and can be effectively operated with little attention.

It should be understood that it is not desired to limit this invention to the exact details of construction and operation of the silo unloader herein specifically shown and described, for various modifications within the scope of the appended claim may occur to persons skilled in the art.

We claim:

In a silage unloader, an elongated main frame radiating from and being revolvable about the central upright axis of the silo, a positive driving wheel disposed on each of the opposite sides of and in close proximity to the outer swinging end of said frame and each having peripheral cleats cooperable with the ensilage to propel the frame about said axis, a longitudinally adjustable propelling shaft for each of said wheels radiating from said axis, an adjustable connection interposed directly between the outer wheel engaging end portion of each of said shafts and the corresponding end of said frame directly between said driving wheels, an endless conveyor suspended from said frame and being operable to transport ensilage toward said axis, and a propelling motor carried by the outer end of said frame and being drivingly connected to the inner ends of said shafts and conveyor adjacent to said axis.

References Cited in the file of this patent

UNITED STATES PATENTS

| | | |
|---|---|---|
| 2,651,438 | Peterson | Sept. 8, 1953 |
| 2,671,696 | McLean | Mar. 9, 1954 |
| 2,677,474 | Long et al. | May 4, 1954 |
| 2,678,241 | Miller | May 11, 1954 |
| 2,719,058 | Van Dusen | Sept. 27, 1955 |
| 2,756,112 | Knutson | July 24, 1956 |
| 2,788,247 | Chapman | Apr. 9, 1957 |
| 2,801,885 | Harris | Aug. 6, 1957 |